(12) United States Patent
Zebe, Jr.

(10) Patent No.: US 7,287,304 B2
(45) Date of Patent: Oct. 30, 2007

(54) CAM CLEAT CONSTRUCTION

(76) Inventor: Charles W. Zebe, Jr., 1182 Hedding Rd., Columbus, NJ (US) 08022

(*) Notice: Subject to any disclaimer, the term of this patent is extended or adjusted under 35 U.S.C. 154(b) by 154 days.

(21) Appl. No.: 11/314,872

(22) Filed: Dec. 20, 2005

(65) Prior Publication Data

US 2007/0137003 A1 Jun. 21, 2007

(51) Int. Cl.
*F16G 11/10* (2006.01)
*A43C 11/00* (2006.01)

(52) U.S. Cl. .................................. 24/134 P; 24/712.6

(58) Field of Classification Search ............. 24/134 P, 24/712.1, 712.2, 712.5, 712.6; 36/50.1; 114/218
See application file for complete search history.

(56) References Cited

U.S. PATENT DOCUMENTS

| | | |
|---|---|---|
| 56,806 A | 7/1866 | Scripture |
| 105,236 A | 7/1870 | O'Hara |
| 400,812 A | 4/1889 | Wilson, Jr. |
| 511,326 A | 12/1893 | DeLong et al. |
| D29,919 S | 1/1899 | Tremble et al. |
| D30,652 S | 5/1899 | Pardee et al. |
| 630,984 A | 8/1899 | Lovell |
| 779,710 A | 1/1905 | Henderson |
| 908,704 A | 1/1909 | Sprinkle |
| 1,094,262 A | 4/1914 | Spangenberg |
| 1,116,142 A | 11/1914 | Slocum |
| 1,137,381 A | 4/1915 | Burket |
| 1,520,716 A | 12/1924 | Judd |
| 1,530,713 A | 3/1925 | Clark |
| 1,544,225 A | 6/1925 | Barros |
| 1,767,732 A | 6/1930 | Breadon |
| 1,772,673 A | 8/1930 | MacDonald |
| 1,792,923 A | 2/1931 | O'Neil |
| 1,823,412 A | 9/1931 | Schwarze |
| 2,036,482 A | 4/1936 | Larson |
| 2,254,579 A | 9/1941 | Okie |
| 2,287,985 A | 6/1942 | Gookin |
| D166,328 S | 4/1952 | Maring |
| D170,787 S | 11/1953 | Wood |
| 2,845,673 A | 8/1958 | Weis |
| 2,967,340 A | 1/1961 | Pernecky, Jr. |
| 3,108,385 A | 10/1963 | Teufel |
| 3,112,545 A | 12/1963 | Williams |
| 3,265,032 A | 8/1966 | Hume |
| 3,279,015 A | 10/1966 | Henning |
| 3,333,304 A | 8/1967 | Daddona, Jr. |
| 3,490,156 A | 1/1970 | Lollman et al. |
| D224,584 S | 8/1972 | Parpaiola et al. |
| 3,703,775 A | 11/1972 | Gatti |
| 3,730,129 A | 5/1973 | Helms |
| 3,744,105 A | 7/1973 | Laurita |
| 3,750,611 A | 8/1973 | Field |

(Continued)

*Primary Examiner*—Robert J. Sandy
(74) *Attorney, Agent, or Firm*—Sperry, Zoda & Kane (57) ABSTRACT

A cam cleat particularly usable for securing laces of footwear which is easy and quick to assembly making use of a base member with vertically extending studs including vertical slots defined therein to facilitate the studs flexing inwardly to a smaller diameter to facilitate placement of engaging caps on the studs with the respective locking rims of the studs being engageable into locking grooves defined in the mated surfaces of the engaging caps. In this manner the caps can be snapped onto the mounting studs merely by exerting downward pressure thereon with a return spring held in the proper position.

20 Claims, 3 Drawing Sheets

U.S. PATENT DOCUMENTS

| | | |
|---|---|---|
| 3,765,061 A | 10/1973 | Nash |
| 3,795,218 A | 3/1974 | Merry |
| 3,808,644 A | 5/1974 | Schoch |
| 3,815,538 A | 6/1974 | Jurgich |
| 3,834,048 A | 9/1974 | Maurer |
| 3,936,914 A | 2/1976 | Mancini |
| D247,217 S | 2/1978 | Merry |
| 4,071,964 A | 2/1978 | Vogiatzis |
| 4,084,532 A | 4/1978 | Feder |
| 4,092,941 A | 6/1978 | Gryglas |
| 4,217,847 A | 8/1980 | McCloud |
| 4,278,042 A | 7/1981 | Lindquist |
| 4,348,974 A | 9/1982 | Lerner |
| 4,397,253 A | 8/1983 | Uecker et al. |
| 4,414,910 A * | 11/1983 | Renton ................ 114/218 |
| 4,453,486 A | 6/1984 | Harken |
| 4,553,495 A | 11/1985 | Lerner |
| 4,620,499 A | 11/1986 | Slemmons |
| 4,633,548 A | 1/1987 | Siskind et al. |
| 4,640,025 A | 2/1987 | DeRenzo |
| 4,660,493 A | 4/1987 | Lowry, III |
| 4,727,627 A | 3/1988 | Baggio et al. |
| 4,766,835 A | 8/1988 | Randall et al. |
| 4,807,333 A | 2/1989 | Boden |
| 4,843,687 A | 7/1989 | Kroepelin, Jr. |
| 4,899,423 A | 2/1990 | Randall |
| 4,907,352 A | 3/1990 | Ginsberg |
| 4,916,833 A | 4/1990 | Nwoko |
| 4,956,897 A | 9/1990 | Speedie |
| 5,070,805 A | 12/1991 | Plante |
| 5,133,111 A | 7/1992 | Brown |
| 5,158,428 A | 10/1992 | Gessner et al. |
| 5,177,882 A | 1/1993 | Berger |
| 5,181,331 A | 1/1993 | Berger |
| 5,205,055 A | 4/1993 | Harrell |
| 5,333,398 A | 8/1994 | Seo |
| 5,335,401 A | 8/1994 | Hanson |
| 5,345,697 A | 9/1994 | Quellais |
| 5,349,764 A | 9/1994 | Posner |
| 5,467,511 A | 11/1995 | Kubo |
| 5,526,585 A | 6/1996 | Brown et al. |
| 5,537,763 A | 7/1996 | Donnadieu et al. |
| D373,464 S | 9/1996 | Hnarakis |
| 5,566,474 A | 10/1996 | Leick et al. |
| D375,831 S | 11/1996 | Perry |
| D377,114 S | 1/1997 | Crowley et al. |
| 5,640,785 A | 6/1997 | Egelja |
| 5,647,104 A | 7/1997 | James |
| 5,755,044 A | 5/1998 | Veylupek |
| 5,784,979 A | 7/1998 | Nelson, III |
| 5,848,457 A | 12/1998 | Silagy |
| 5,852,853 A * | 12/1998 | Pennoyer, Jr. ............ 24/134 P |
| D405,601 S | 2/1999 | Zebe, Jr. |
| D405,602 S | 2/1999 | Zebe, Jr. |
| 5,906,057 A | 5/1999 | Borsoi |
| 5,909,947 A | 6/1999 | DeMarchi |
| 5,926,976 A | 7/1999 | Cretinon et al. |
| 5,931,112 A | 8/1999 | Lacan |
| 5,940,990 A | 8/1999 | Barret |
| 5,956,823 A | 9/1999 | Borel |
| 5,966,841 A | 10/1999 | Barret |
| 5,979,080 A | 11/1999 | Borsoi |
| 5,996,256 A | 12/1999 | Zebe, Jr. |
| D422,530 S | 4/2000 | Zebe, Jr. |
| D426,952 S | 6/2000 | Zebe, Jr. |
| D435,719 S | 1/2001 | Zebe, Jr. |
| 6,178,604 B1 * | 1/2001 | Pennoyer, Jr. ............ 24/134 P |
| D440,036 S | 4/2001 | Zebe, Jr. |
| D440,395 S | 4/2001 | Zebe, Jr. |
| D440,759 S | 4/2001 | Zebe, Jr. |
| 6,324,774 B1 | 12/2001 | Zebe, Jr. |
| D460,858 S | 7/2002 | Zebe, Jr. |
| D462,163 S | 9/2002 | Zebe, Jr. |
| 6,505,384 B1 | 1/2003 | Renton et al. |
| 6,722,303 B2 | 4/2004 | Lob et al. |
| 6,857,381 B2 | 2/2005 | Siewert et al. |

* cited by examiner

CAM CLEAT CONSTRUCTION

BACKGROUND OF THE INVENTION

1. Field of the Invention

The present invention deals with the field of engagement devices for use for retaining the laces of footwear. Normally such laces are tied or otherwise engaged with respect to one another. The cam cleat construction of the present invention provides an easily assembled construction for a cam cleat which can be easily utilized mounted on footwear and easily assembled for usage thereon.

2. Description of the Prior Art

Numerous devices have been designed for securing laces of footwear and various designs have been disclosed for cam cleat constructions and examples of prior art pertinent to this subject matter includes British Patent No. 4010 patented Feb. 25, 1895 to T. Hutchinson et al on "A New Or Improved Fastener For Securing The Ends Of Boot And Shoe Laces"; and U.S. Design Pat. No. 29,919 patented Jan. 3, 1899 to J. J. Tremble on a "Design For A Lacing-Hook"; and U.S. Design Pat. No. 30,652 patented May 2, 1899 to W. H. Pardee et al on a "Lace Fastener"; and U.S. Pat. No. 56,806 patented Jul. 31, 1866 to E. S. Scripture on an "Improved Shoe-String Fastener"; and U.S. Pat. No. 105,236 patented Jul. 12, 1870 to C. M. O'Hara on a "Shoestring Fastener"; and U.S. Pat. No. 400,812 patented Apr. 22, 1889 to S. Wilson, Jr. and assigned one-half to H. C. Conkle on a "Shoe-Fastening"; and U.S. Pat. No. 511,326 patented Dec. 26, 1893 to O. A. DeLong et al and assigned to Kempshall Specialty Manufacturing Company of New Jersey on a "Hook"; and U.S. Pat. No. 630,984 patented Aug. 15, 1899 to A. K. Lovell on a "Guard For Lacing Hooks"; and U.S. Pat. No. 779,710 patented Jan. 10, 1905 to A. M Henderson on a "Shoe Lacing Holding Clasp"; and U.S. Pat. No. 908,704 patented Jan. 5, 1909 to C. C. Sprinkle and assigned one-half to Mahlon A. Stair on a "Shoe Fastener"; and U.S. Pat. No. 1,094,262 patented Apr. 21, 1914 to M. Spangenberg on a "Shoe Lace Fastening Device"; and U.S. Pat. No. 1,116,142 patented Nov. 3, 1914 to F. E. Slocum on a "Shoe Fastener"; and U.S. Pat. No. 1,137,381 patented Apr. 27, 1915 to E. Burket on a "Shoe Lace Holder"; and U.S. Pat. No. 1,520,716 patented Dec. 30, 1924 to J. G. Judd on a "Wire Gripper"; and U.S. Pat. No. 1,530,713 patented Mar. 24, 1925 to J. S. D. Clark on a "Lacing Device For Boots And Shoes"; and U.S. Pat. No. 1,544,225 patented Jun. 30, 1925 to J. DeBarros on a "Shoe Lace Fastener"; and U.S. Pat. No. 1,767,732 patented Jun. 24, 1930 to W. C. Breadon on a "Shoe Lace"; and U.S. Pat. No. 1,772,673 patented Aug. 12, 1930 to J. D. MacDonald on a "Lace Fastening Means For Footwear"; and U.S. Pat. No. 1,792,923 patented Feb. 17, 1931 to R. W. O'Neil and assigned to The shoe Hardware Co. on a "Buckle"; and U.S. Pat. No. 1,823,412 patented Sep. 15, 1931 to P. Schwarze on a "Detachable Head For The Free Ends Of Laces"; and U.S. Pat. No. 2,036,482 patented Apr. 7, 1936 to P. R. S. Larson on an "Elastic Shoe Lace"; and U.S. Pat. No. 2,254,579 patented Sep. 2, 1941 to H. P. Okie and assigned one-fourth to Benjamin S. Bell and one-fourth to Louise A. Green on a "Clip To Keep In Engagement The Ends Of Shoestrings Or Other Fasteners"; and U.S. Pat. No. 2,287,985 patented Jun. 30, 1942 to S. R. Gookin and assigned to United Shoe Machinery Corporation on a "Laced Boot"; and U.S. Design Pat. No. 166,328 patented Apr. 1, 1952 to W. A. Maring on a "Lacing Hook For Shoes Or Similar Article"; and U.S. Design Pat. No. 170,787 patented Nov. 3, 1953 to H. H. Wood and assigned to Thomas Walker Limited on a "Hook For A Trouser Waistband"; and U.S. Pat. No. 2,845,673 patented Aug. 5, 1958 to T. Weis on a "Shoe Lace Clip"; and U.S. Pat. No. 2,967,340 patented Jan. 10, 1961 to P. Pernecky, Jr. on a "Glove And Like Article Holder"; and U.S. Pat. No. 3,108,385 patented Oct. 29, 1963 to E. Teufel and assigned to Rieker & Co. on a "Tying Means For Shoes And Boots"; and U.S. Pat. No. 3,112,545 patented Dec. 3, 1963 to L. Williams on a "Shoe Fastening Device"; and U.S. Pat. No. 3,265,032 patented Aug. 9, 1966 to P. H. Hume on a "Cam Cleat"; and U.S. Pat. No. 3,279,015 patented Oct. 18, 1966 to L. M. Henning and assigned one-fourth to Byron V. Curry and one-fourth to William Jacquet Gribble and one-half to Normal S. Henning on a "Shoelace Apparatus"; and U.S. Pat. No. 3,333,304 patented Aug. 1, 1967 to D. J. Daddona, Jr. and assigned to Scovill Manufacturing Company on a "Lacing Device"; and U.S. Pat. No. 3,490,156 patented Jan. 20, 1970 to P. Lollmann et al and assigned to Rieker & Co. on "Sports Footwear"; and U.S. Design Pat. No. 224,584 patented Aug. 8, 1972 to D. Parpaioila et al on a "Lacing Hook"; and U.S. Pat. No. 3,703,775 patented Nov. 28, 1972 to J. Gatti on "Football Boots"; and U.S. Pat. No. 3,730,129 patented May 1, 1973 to J. A. Helms and assigned to Seahorse Spars And Equipment, Ltd. on an "Extruded Cam Cleat"; and U.S. Pat. No. 3,744,105 patented Jul. 10, 1973 to J. N. Laurita and assigned to A. Rifkin Co. on a "Drawstring Construction"; and U.S. Pat. No. 3,750,611 patented Aug. 7, 1973 to G. A. Field and assigned to S and R Associates, Inc. on a "Two-Way Cam Cleat"; and U.S. Pat. No. 3,765,061 patented Oct. 16, 1973 to D. B. Nash on a "Lever-Release Cam Cleat"; and U.S. Pat. No. 3,795,218 patented Mar. 5, 1974 to C. A. Merry and assigned to Schaefer Marine Products on a "Cam Cleat"; and U.S. Pat. No. 3,795,218 patented Mar. 5, 1974 to C. A. Merry and assigned to Schaefer Marine Products on a "Cam Cleat"; and U.S. Pat. No. 3,808,644 patented May 7, 1974 to R. Schoch and assigned to Weinmann Aktiengesellschaft on a "Closure Device For Shoes, Particularly For Ski Shoes"; and U.S. Pat. No. 3,815,538 patented Jun. 11, 1974 to D. Jurgich on a "Cam Cleat Releasing Mechanism"; and U.S. Pat. No. 3,834,048 patented Sep. 10, 1974 to W. Maurer on "Shoe Fastening"; and U.S. Pat. No. 3,936,914 patented Feb. 10, 1976 to W. A. Mancini on a "Separable Fastener"; and U.S. Pat. No. 4,071,964 patented Feb. 7, 1978 to C. Vogiatzis on a "Footwear Fastening System"; and U.S. Design Pat. No. Des. 247,217 patented Feb. 14, 1978 to C. A. Merry and assigned to Schaefer Marine Products on a "Cam Cleat"; and U.S. Pat. No. 4,084,532 patented Apr. 18, 1978 to E. Feder on "Line Cleats For Securing Ropes, But Especially For Lines To Sails Of Sailboats"; and U.S. Pat. No. 4,092,941 patented Jun. 6, 1978 to S. Gryglas on an "Adjustable Two-Way Cam Cleat"; and U.S. Pat. No. 4,217,847 patented Aug. 19, 1980 to R. A. McCloud on a "Self-Release Cam Cleat"; and U.S. Pat. No. 4,278,042 patented Jul. 14, 1981 to B. V. Lindquist on a "Cam Cleat"; and U.S. Pat. No. 4,348,974 patented Sep. 14, 1982 to M. Lerner on a "Cleat"; and U.S. Pat. No. 4,397,253 patented Aug. 9, 1983 to R. L. Uecker on a "Rope Cleat Teeth Structure"; and U.S. Pat. No. 4,453,486 patented Jun. 12, 1984 to P. O. Harken on a "Cam Cleat"; and U.S. Pat. No. 4,553,495 patented Nov. 19, 1985 to M. Lerner on a "Cleat"; and U.S. Pat. No. 4,620,499 patented Nov. 4, 1986 to A. J. Slemmons on a "Cam Cleat"; and U.S. Pat. No. 4,633,548 patented Jan. 6, 1987 to L. B. M. Siskind et al on a "Speed Lace Structure"; and U.S. Pat. No. 4,640,025 patented Feb. 3, 1987 to J. M. De Renzo on a "Figure Eight Shoe Tie System"; and U.S. Pat. No. 4,660,493 patented Apr. 28, 1987 to J. A. Lowry on a "Dual Directional Cam Cleat"; and U.S. Pat. No. 4,727,627 patented Mar. 1, 1988 to G. Baggio et al and assigned to Nordica S. p. A. on a "Locking Device Particularly For Ski Boots"; and U.S. Pat. No. 4,766,835 patented Aug. 30, 1988 to R. C. Randall et al and assigned to R. C. Randall on a "Rope Cleat"; and U.S. Pat. No. 4,807,333 patented Feb. 28, 1989 to O. W. Boden on a "Cord Lock With Cord Removal Slot"; and U.S. Pat. No. 4,843,687 patented Jul. 4, 1989 to W. F. Kroepelin, Jr. on a "Hand Held Rope Cleat"; and U.S. Pat. No. 4,899,423 patented Feb. 13, 1990 to R. C. Randall on a "Rope Cleat"; and U.S. Pat. No. 4,907,352 patented Mar. 13, 1990 to J. Ginsberg on a "Shoe Lace Replacing And Shoe Fastening Device"; and U.S. Pat. No. 4,916,833 patented Apr. 17, 1990 to L. Nwoko on an "Enhanced Speed Lacing Device With An Integrated Adjustable Width, Adjustable Tension System"; and U.S. Pat. No. 4,956,897 patented Sep. 18, 1990 to R. Speedie and assigned to Ronstan International Pty. Ltd. on a "Cam Cleat"; and U.S. Pat. No. 5,070,805 patented Dec. 10, 1991 to W. M. Plante on a "Camming Cleat Member For Rope"; and U.S. Pat. No. 5,133,111 patented Jul. 28, 1992 to M. A. brown on a "Cam Cleat"; and U.S. Pat. No. 5,158,428 patented Oct. 27, 1992 to G. E. Gessner et al on a "Shoelace Securing System"; and U.S. Pat. No. 5,177,882 patented Jan. 12, 1993 to C. Berger and assigned to PUMA AG Rudolf Dassler Sport on a "Shoe With A Central Fastene"; and U.S. Pat. No. 5,181,331 patented Jan. 26, 1993 to C. Berger and assigned to Puma Rudolf Dassler Sport on a "Shoe With Flexible Upper Material Provided With A Closing Device"; and U.S. Pat. No. 5,205,055 patented Apr. 27, 1993 to A. D. Harrell on a "Pneumatic Shoe Lacing Apparatus"; and U.S. Pat. No. 5,333,398 patented Aug. 2, 1994 to Y. S. Seo on a "Lace Fastening Cleat And Shoe"; and U.S. Pat. No. 5,335,401 patented Aug. 9, 1994 to G. L. Hanson on a "Shoelace Tightening And Locking Device"; and U.S. Pat. No. 5,345,697 patented Sep. 13, 1994 to J. Quellais and assigned to Salomon S. A. on a "Boot Tightened By A Flexible Link"; and U.S. Pat. No. 5,349,764 patented Sep. 27, 1994 to S. Posner and assigned to Dan Lynn Industries, Inc. on a "Shoe Securement Apparatus"; and U.S. Pat. No. 5,467,511 patented Nov. 21, 1995 to Y. Kubo and assigned to Morito Kabushiki Gaisha on a "Shoelace Fastening Device"; and U.S. Pat. No. 5,526,585 patented Jun. 18, 1996 to E. G. Brown et al on an "Attachment Device For Use With A Lace-Substitute Hand-Actuable Shoe-Closure System"; and U.S. Pat. No. 5,537,763 patented Jul. 23, 1996 to T. Donnadieu et al and assigned to Salomon S. A. on a "Boot With Tightening System With Memorization Of Tension"; and U.S. Design Pat. No. Des. 373,464 patented Sep. 10, 1996 to A. E. Hnarakis on a "Sports Shoe Lacing"; and U.S. Pat. No. 5,566,474 patented Oct. 22, 1996 to P. Leick et al and assigned to Salomon S. A. on a "Sport Boot Having A Fixed-Lace Closure System"; and U.S. Design Pat. No. Des. 375,831 patented Nov. 26, 1996 to D. L. Perry and assigned to D P Design, Inc. on a "Tension And Length Adjuster For A Shoelace Or Shock Cord"; and U.S. Design Pat. No. Des. 377,114 patented Jan. 7, 1997 to K. J. Crowley et al and assigned to Fila U.S.A., Inc. on "Shoe Eyelets"; and U.S. Pat. No. 5,640,785 patented Jun. 24, 1997 to S. Egelja and assigned to Items International, Inc. on "Resilient Loops And Mating Hooks For Securing Footwear To A Foot"; and U.S. Pat. No. 5,647,104 patented Jul. 15, 1997 to L. H. James and assigned to Laurence H. James on a "Cable Fastener"; and U.S. Pat. No. 5,755,044 patented May 26, 1998 to R. J. Veylupek on a "Shoe Lacing System"; and U.S. Pat. No. 5,784,979 patented Jul. 28, 1998 to R. H. Nelson, III on an "Adjustable Load Automatic Releasing Cleat"; and U.S. Pat. No. 5,848,457 patented Dec. 15, 1998 to H. Silagy on a "Lacing System For Traditional Footwear"; and U.S. Design Pat. No. Des. 405,601 patented Feb. 16, 1999 to C. W. Zebe, Jr. on a "Footwear Closure"; and U.S. Design Pat. No. Des. 405,602 patented Feb. 16, 1999 to C. W. Zebe, Jr. on a "Footwear Closure"; and U.S. Pat. No. 5,906,057 patented May 25, 1999 to B. Borsoi and assigned to Salomon S. A. on a "Sports Boot Including Flexible And Traction Resistant Return Elements"; and U.S. Pat. No. 5,909,947 patented Jun. 8, 1999 to J. DeMarchi and assigned to Salomon S. A. on a "Sport Footwear Assembly"; and U.S. Pat. No. 5,926,976 patented Jul. 27, 1999 to F. Cretinon et al and assigned to Salomon S. A. on a "Sport Boot"; and U.S. Pat. No. 5,931,112 patented Aug. 3, 1999 to G. H. Lacan on an "Easy-Releasing Cleat"; and U.S. Pat. No. 5,940,990 patented Aug. 24, 1999 to T. Barret and assigned to Salomon S. A. on a "Shoe With An At Least Partially Elastic Lining And Volume Adjusting System"; and U.S. Pat. No. 5,956,823 patented Sep. 28, 1999 to R. Borel and assigned to Salomon S. A. on a "Guide And Blocking Assembly For A Boot"; and U.S. Pat. No. 5,966,841 patented Oct. 19, 1999 to T. Barret and assigned to Salomon S. A. on a "Sport Boot"; and U.S. Pat. No. 5,979,080 patented Nov. 9, 1999 to B. Borsoi and assigned to Salomon S. A. on a "Lace Having Variable Sections For Sports Boots And Sports Boot Equipped With Such A Lace"; and U.S. Pat. No. 5,996,256 patented Dec. 7, 1999 to C. W. Zebe, Jr. on "Footwear Construction With Improved Closure Means"; and U.S. Design Pat. No. Des. 422,530 patented Apr. 11, 2000 to C. W. Zebe, Jr. on a "Belt Securement Device"; and U.S. Design Pat. No. Des. 426,952 patented Jun. 27, 2000 to C. W. Zebe, Jr. on a "Flap Closure"; and U.S. Design Pat. No. D435,719 patented Jan. 2, 2001 to C. W. Zebe, Jr. on a "Sandal Closure Device"; and U.S. Design Pat. No. D440, 036 patented Apr. 10, 2001 to C. W. Zebe, Jr. on a "Footwear Closure"; and U.S. Design Pat. No. D440,3395 patented Apr. 17, 2001 to C. W. Zebe, Jr. on a "Sandal Closure Device With Loop Lead"; and U.S. Design Pat. No. D440,759 patented Apr. 24, 2001 to C. W. Zebe, Jr. on a "Footwear Closure"; and U.S. Pat. No. 6,324,774 patented Dec. 4, 2001 to C. W. Zebe, Jr. on a Shoelace Retaining Clip And Footwear Closure Means Using Same"; and U.S. Design Pat. No. D460,858 patented Jul. 30, 2002 to C. W. Zebe, Jr. on a "Footwear Retaining Device With Cam Cleat Longitudinal Line Retaining Clip And Rear Clip For Retaining Lacing Tip"; and U.S. Design Pat. No. D462,163 patented Sep. 3, 2002 to C. W. Zebe, Jr. on a "Footwear Retaining Device With Cam Cleat Longitudinal Line Retaining Clip And Adjustable Length Lacing"; and U.S. Pat. No. 6,505,384 patented Jan. 14, 2003 to J. E. Renton et al on a "Cleat"; and U.S. Pat. No. 6,722,303 patented Apr. 20, 2004 to C. Lob et al and assigned to Harken, Inc. on a "Fairlead And Cam Assembly"; and U.S. Pat. No. 6,857,381 patented Feb. 22, 2005 to W. W. Siewert et al and assigned to Design Extremes, Inc. on a "Cam Cleat With Automatic Fairlead".

SUMMARY OF THE INVENTION

The present invention provides an improved cam cleat construction which can be assembled quickly and easily and is particularly usable mounted on footwear for the purpose of securing footwear laces with respect to one another. This cam cleat construction preferably includes a base member which itself is directly attachable to the footwear when utilized. A first mounting stud is provided extending perpendicularly away from the base member and is preferably formed of a flexibly resilient material. This first mounting stud includes a first convex mounting surface extending therearound which allows pivotal movability after mounting thereof. Also the first mounting stud defines a first bore extending axially therethrough.

A plurality of first slots are defined extending longitudinally along the first convex mounting surface of the first mounting stud. These slots extend inwardly from the first convex mounting surface into the first bore means to be in fluid flow communication with respect thereto. This first slot is to allow significant flexing of the first convex mounting surface inwardly toward the first bore to facilitate mounting thereof in such a manner as to be pivotally movable. The first slot also preferably includes four individual first slots defined at equally spaced locations therearound to further facilitate flexing thereof.

A first locking rim is also defined on the first mounting stud which is preferably arcuate in shape and extends outwardly from the first convex mounting surface to facilitate locking engagement with respect thereto. This first locking rim preferably includes a first outwardly extending lower shoulder to facilitate engagement therewith. A first tab is also preferably included extending outwardly from the first convex mounting surface and a first central hole is preferably defined in a first central bore in such an orientation as to be coaxial with respect to the first central bore.

A first engaging cap is usable with the first mounting stud and defines a first mounting hole extending thereinto. The first mounting hole is adapted to receive the first convex mounting surface of the first mounting stud extending thereinto in order to facilitate pivotally movable attachment therebetween. The first engaging cap further includes a first gripping surface defined externally thereon such as to be adapted to engage footwear laces to facilitate securement thereof. Also defined is a first concave mounting surface located within the first mounting hole. This first concave mounting surface is adapted to extend around the first convex mounting surface and be mated therewith to facilitate movable engagement therewith and allow relative pivotal movement of the first engaging cap with respect to the first mounting stud in order to facilitate engagement of the first gripping surface with respect to the footwear laces located immediately thereadjacent. The first engaging cap will also define a first locking groove within the first mounting hole area thereof along the first concave mounting surface which is annular in shape preferably. This first locking groove is adapted to receive and engage with the first locking rim extending thereinto in order to facilitate securement of the first engaging cap with respect to the first mounting stud while allowing relative pivotal movement therebetween.

The first engaging cap will also include a first spring containment annulus defined within the first mounting hole. It will also include a first enlarged chamber immediately adjacent the first mounting hole which is adapted to receive the first tab extending thereinto. This tab is adapted to limit the magnitude of pivotal movement of the first engaging cap with respect to the first mounting stud because of the containment of the first tab within the first enlarged chamber. A first central alignment pin can also be included oriented axially with respect to the first bore which is adapted to extend into the first central hole of the first mounting stud in order to facilitate alignment therewith during relative movement therebetween pivotally.

A first spring is also preferably included in the form of a coil spring attached to the first mounting stud and attached with respect to the first engaging cap and biased to urge pivotal movement of the first engaging cap with respect thereto in order to facilitate engagement of the first gripping surface with respect to shoe laces positioned thereadjacent. This first spring preferably extends from the first mounting stud to the first engaging cap through the first spring containment annulus.

The cam cleat construction of the present invention will also include a similarly configured second mounting stud which extends preferably perpendicularly away from the base member and is made of a flexibly resilient material. This second mounting stud will be located spatially disposed from the first mounting stud on the base member.

The second mounting stud will include a second convex mounting surface extending therearound to facilitate pivotal movement mounting thereupon. It will also define a second bore extending axially therewithin. A plurality of second slots will be defined extending longitudinally along the second convex mounting surface of the second mounting stud. A second slot will extend inwardly from the second convex mounting surface into the first bore to be in fluid flow communication with respect thereto at all times. The second slot will be adapted to allow flexing of the second mounting surface inwardly toward the second bore to facilitate pivotally movable mounting thereupon. The second slot means will include four individual second slots defined at equally spaced positions around the second mounting studs. A second locking rim is also preferably included which is arcuate and extends outwardly from the second mounting surface in order to facilitate locking engagement therewith. This second locking rim further includes a second outwardly extending lower shoulder which facilitates engagement therewith. A second tab will be included extending outwardly from the second convex surface. A second central hole will be defined in the second central bore thereof which is coaxial with respect to the first central bore.

A second engaging cap will also be included which defines a second mounting hole extending thereinto. This second mounting hole is adapted to receive the second convex mounting surface of the second mounting stud extending thereinto in order to facilitate pivotally movable attachment of these parts together. The second engaging cap further includes a second gripping surface defined externally thereon which is adapted to engage footwear laces to facilitate securement thereof with respect to the footwear. The second gripping surface is positioned adjacent the first gripping surface of the first engaging cap to further facilitate selective engagement therebetween of the footwear laces. The second engaging cap will also include a second concave mounting surface defined within the second mounting hole which is adapted to extend around the second convex mounting surface to facilitate movable engagement therewith an allow pivotal movement of the second engaging cap with respect to the second moving stud to facilitate engagement of the second gripping surface with respect to footwear laces thereadjacent.

Also included is a second locking groove defined within the second mounting hole of the second engaging cap along the second concave mounting surface. This second locking groove is adapted to receive and engage with the second locking rim extending thereinto for the purpose of facilitating pivotally movable securement of the second engaging cap with respect to the second mounting stud. The second locking groove is preferably annular in shape. The second engaging cap also preferably includes a second spring containment annulus defined within the second mounting hole and a second enlarged chamber immediately adjacent the second mounting hole. This second enlarged chamber is adapted to receive the second tab extending thereinto in order to limit the magnitude of pivotal movement of the second engaging cap with respect to the second mounting stud responsive to containment of the second tab within the second enlarged chamber. Also included is a second central alignment pin oriented axially relative to the second bore which is adapted to extend into the second central hole of the second mounting stud to maintain alignment between the second mounting stud and the second engaging cap during pivotal movement relatively therebetween. A second spring is also preferably included of a general coil spring shape. This second spring is designed specifically to be attached with respect to the second mounting stud and with respect to the second engaging cap. It is biased in order to urge pivotal movement of the second engaging cap with respect to the second mounting stud to facilitate engagement of the second gripping surface with respect to footwear laces positioned thereadjacent between the respective gripping surfaces thereof. The second spring is preferably positioned extending from the second mounting stud to the second engaging cap through the second spring containment annulus.

It is an object of the cam cleat construction of the present invention to be easy and quick to assemble.

It is an object of the cam cleat construction of the present invention to be particularly usable with footwear for facilitating the securement of footwear laces.

It is an object of the cam cleat construction of the present invention which can be made of a flexibly resilient plastic material.

It is an object of the cam cleat construction of the present invention which can be easily and conveniently attached to footwear for use in securement of the laces used in association therewith.

It is an object of the cam cleat construction of the present invention which has minimal maintenance requirements.

It is an object of the cam cleat construction of the present invention which requires a minimal in capital cost outlay to manufacture.

It is an object of the cam cleat construction of the present invention which is simple, convenient and inexpensive to manufacture.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The uniquely improved construction of a cam cleat 10 is shown in the present invention which is particularly usable for retaining footwear laces 12 on various types of footwear including shoes, sneakers, boots, etc. The cam cleat of the present invention is easy to produce and extremely easy to assemble and has been found to be uniquely usable in reduced size configurations for the purpose of providing a means for securing the footwear laces other than the conventional tying of a bow with such laces.

The construction of the cam cleat 10 of the present invention includes a base member 14. This member 14 is designed to be attached directly to the footwear of a user in such a location as to be able to retain the footwear laces with respect thereto. A first mounting stud 16 is included extending upwardly from the base member preferably perpendicularly upwardly therefrom in such a manner that a first engaging cap 24 can be pivotally mounted thereon.

Also a second mounting stud 36 is preferably positioned extending upwardly, preferably perpendicularly, from the base member 14 such that a second engaging cap 46 can be mounted thereon allowing relative pivotal movement therebetween. The positioning of the first engaging cap 24 and the second engaging cap 46 will be defined by the position of the first mounting stud 16 and the second mounting stud 36 upon the base member 14. The spacing between these members will be such that a footwear lace 12 positioned between the first gripping surface 28 of the first engaging cap 24 and the second gripping surface 50 of the second engaging cap 46 will allow gripping thereof. It is important that the spacing between the pivotal movement path of the first gripping surface 28 and the second gripping surface 50 be movable between a position larger than the footwear laces 12 to allow them to be received therebetween and movable pivotally to another position wherein the spacing is less than the size of the footwear laces to facilitate gripping thereof therebetween.

The first mounting stud preferably will include a first convex mounting surface 17 to which the first engaging cap 24 can be mounted. First mounting stud 16 will also include a first bore 18 preferably extending axially therethrough. A first slot 20 will be defined in the first mounting stud 16 to facilitate flexing of the first convex mounting surface 17 to allow snap-on engagement of the first engaging cap 24 thereonto. The first mounting stud 16 will also include a first locking rim 22 generally of an annular shape extending outwardly therefrom to further facilitate locking engagement with respect to the first engaging cap 24.

The first engaging cap 24 will include a first mounting hole 26 defined preferably in the underneath surface thereof. It will include a first gripping surface 28 on the outer surface to facilitate engagement of that surface with respect to footwear laces 12 extending thereadjacent. The first engaging cap 24 will also include a first concave mounting surface 30 which is preferably arcuate and is defined inside of the first mounting hole 26. This first concave mounting surface 30 is preferably mated with and capable of being brought into movable abutment with respect to the first convex mounting surface 17. Thus, first convex mounting surface 17 and first concave mounting surface 30 will be mated to abut one another while still allowing pivotal movement with respect to one another.

The first engaging cap 24 will preferably also include a first locking groove 32 extending therearound. This first locking groove means 32 is defined to receive the first locking rim 22 thereinto. Thus, during assembly, the first engaging cap 24 will be pushed downwardly onto the first mounting stud 16. This downward movement will cause the first mounting hole 26 to engage the first locking rim 22 which will cause the first convex mounting surface 17 of the first mounting stud 16 to flex inwardly toward the first bore 18 defined therewithin. This inward flexing will allow the first engaging cap 24 to move further downwardly until the first locking rim 22 of the first mounting stud 16 moves into position within the first locking groove 32 defined in the first engaging cap 24. This engagement will lock the first engaging cap 24 onto the first mounting stud 16 while allowing relative pivotal movement therebetween.

It is also important that the first engaging cap 24 be biased in one direction to be maintained in this orientation in the steady state position prior to engagement with footwear laces 12 extending thereadjacent. For this purpose a first spring means 34 will preferably be included extending between the first engaging cap 24 and the first mounting stud 16. This first spring means 34 will preferably be of a coil spring configuration and will bias the first engaging cap 24 in one direction with respect to the first mounting stud 16 such that pivotal movement against the force of the spring when released will allow the spring to rotate the first engaging cap 24 back to the steady state biased position. As shown in the figures of the present invention, the first engaging cap 24 will be biased to the furthest counterclockwise position relative to the first mounting stud 16 therebelow. On the other hand the second engaging cap 46, which is a mirror image of the construction beneath the first engaging cap 24, will always be biased to the extreme clockwise position. In this manner both members will always be biased by the relative springs toward one another to facilitate narrowing of the distance between the relative gripping surfaces thereof to facilitate holding of a footwear lace 12 therebetween firmly and securely as desired.

Figure 5:
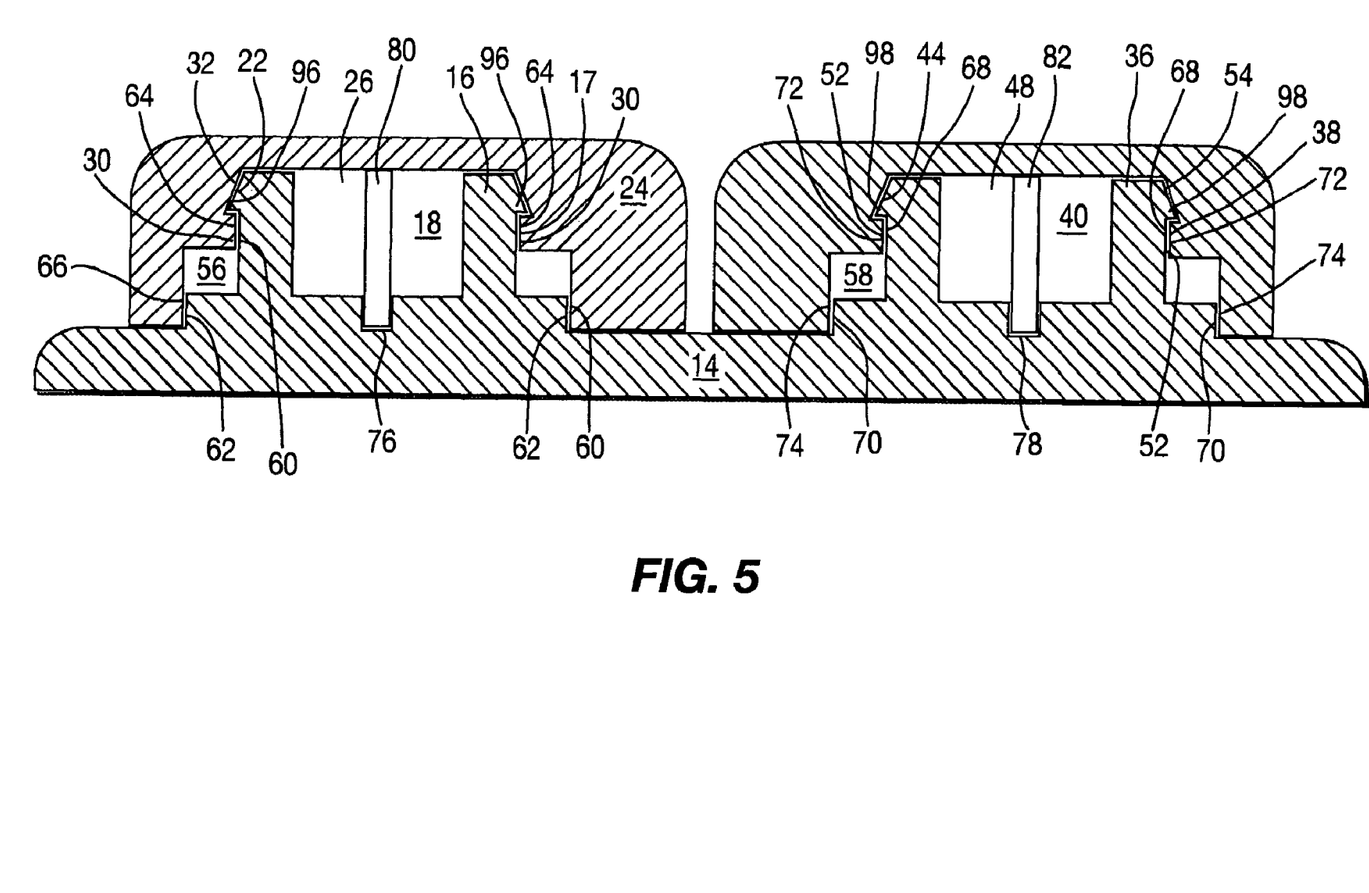
FIG. 5 is a vertical cross-section of an embodiment of the cam cleat construction of the present invention.

Preferably the first spring means 34 will be of a coil spring configuration and will extend through the first spring containment annulus 56 between the first mounting stud 16 and the first engaging cap 24. The first spring containment annulus 56 is defined between these parts as best shown in FIG. 5.

To further facilitate control of movement of the first engaging cap 24 relative to the first mounting stud 16 the configuration of the first convex mounting surface 17 when mated with the first concave mounting surface 30 can be constructed with a dual surface configuration. As shown in FIG. 5, preferably the first convex mounting surface 17 will include a first inner convex mounting surface 60 as well as a first outer convex mounting surface 62 spaced apart therefrom and preferably closer to the base member 14. Also the first concave mounting surface 30 will define a first inner concave mounting surface 64 and a first outer concave mounting surface 66 similarly spaced. With this construction the first inner convex mounting surface 60 will be mated in engaging abutment with the first inner concave mounting surface 64 to facilitate control of pivotal movement of the first engaging cap 24 with respect to the first mounting stud 16. Additionally the first outer convex mounting surface 62 will be mated and in abutting engagement with respect to the first outer concave surface 66 to further achieve control of pivotal movement of the first engaging cap 24 with respect to the first mounting stud 16. These dual independent means of controlling movement of the first engaging cap 24 with respect to the first mounting stud 16 will greatly facilitate maintaining of proper alignment and positioning and will minimize maintenance requirements.

Thus we see that with this construction the engagement of the first mounting cap 24 onto the first mounting stud 16 is easy to achieve merely by exerting downward pressure until the first locking rim 22 snaps into the first locking groove 32. This engagement is achieved by defining the slots in the first mounting stud which allows it to flex inwardly toward the first bore 18 extending axially therethrough. Once this engagement is achieved the first engaging cap 24 will be capable of pivotal movement relative to the first mounting stud 16 as guided by the mating between the first inner convex mounting surface 60 and the first inner concave mounting surface 64 as well as mating between the first outer convex mounting surface 62 and the first outer concave mounting surface 66.

Furthermore the first mounting stud 16 can define a first central hole 76 therein and the first engaging cap 24 can define a first central alignment pin 80 extending axially down through the first mounting hole 24 defined therein. This configuration is shown best in FIG. 5. With the first central alignment pin 80 positioned in the first central hole 76 vertical axial alignment during pivotal movement between the first engaging cap 24 and the first mounting stud 16 is properly maintained.

In order to limit the magnitude of pivotal movement between the first engaging cap 24 and the first mounting stud 16 a first tab means 86 will preferably be positioned extending outwardly from the first mounting stud 16 and the first engaging cap 24 will preferably define a first enlarged chamber 84. The first tab 86 will extend into the first enlarged chamber 84 and be contained therein. The first tab 86 will be movable through the entire extent of the size of the first enlarged chamber 84 from a point where it contacts one side to a point where it contacts the opposite side. This will define the limits of the magnitude of pivotal movement of the first engaging cap 24 relative to the first mounting stud 16.

Figure 1:
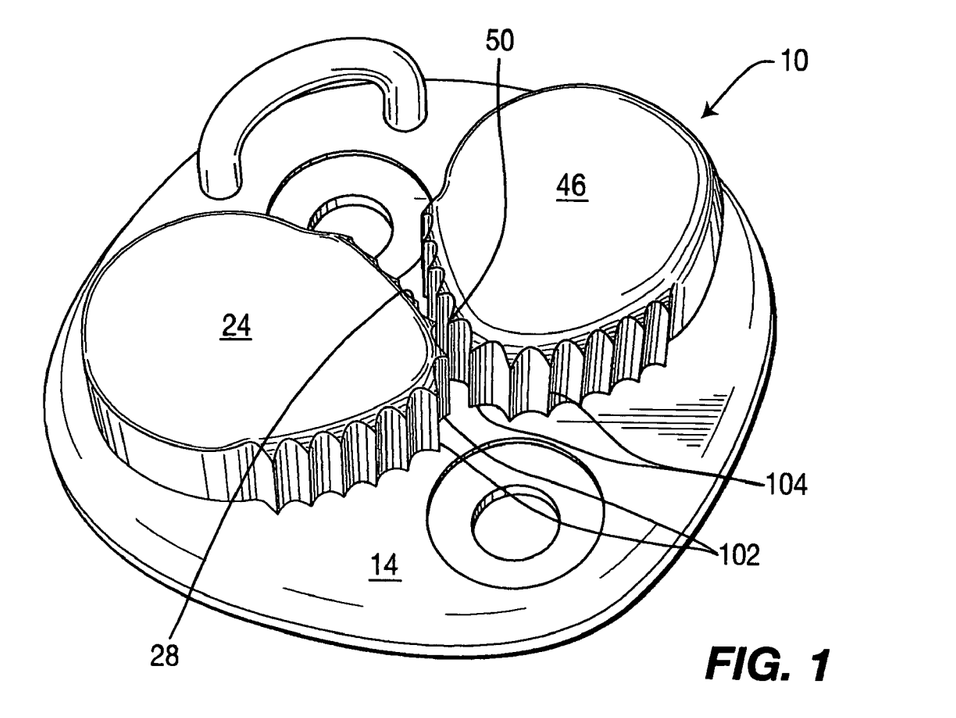
FIG. 1 is a top three-quarter perspective illustration of an embodiment of the cam cleat construction of the present invention.
Figure 2:
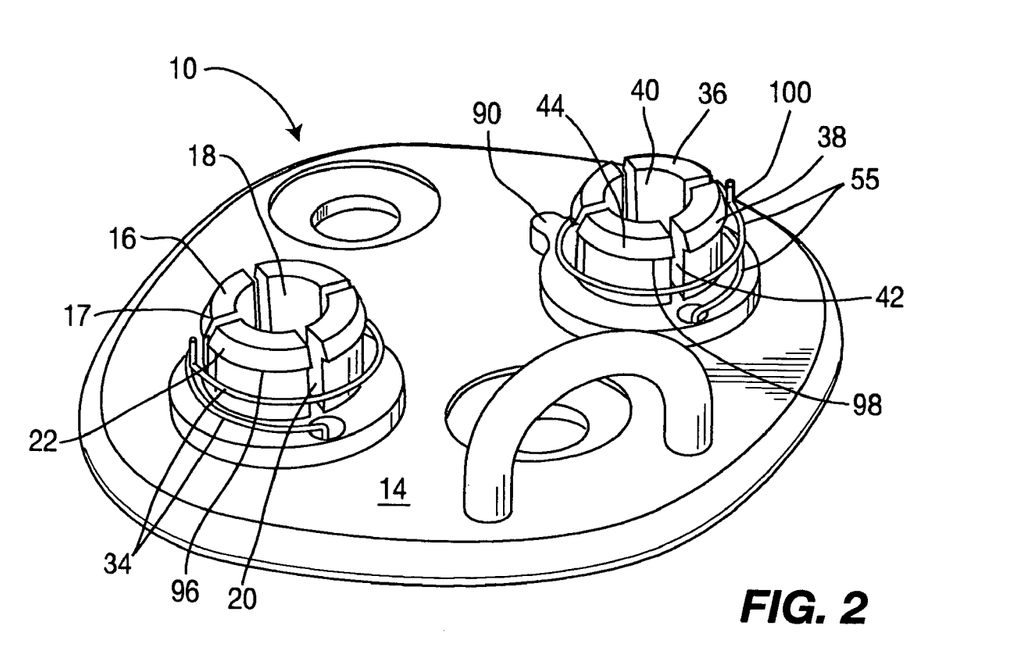
FIG. 2 is a top perspective illustration of an embodiment of the cam cleat construction of the present invention showing the first and second engaging caps removed for illustration purposes.
Figure 3:
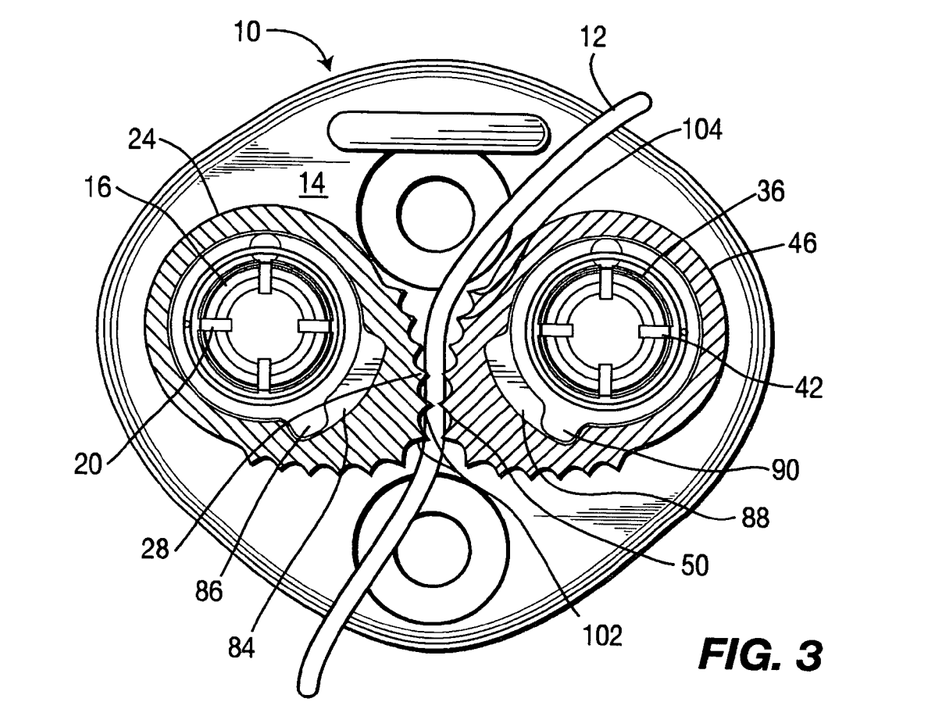
FIG. 3 is a top cross-sectional view of an embodiment of the cam cleat construction of the present invention.
Figure 4:
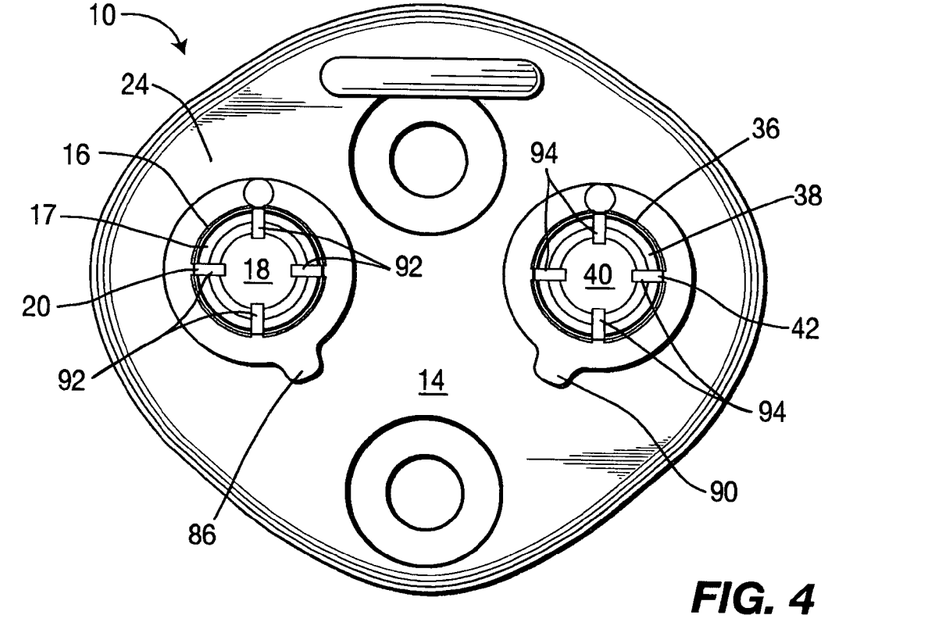
FIG. 4 is a top cross-sectional view of an embodiment of the cam cleat construction of the present invention with the first and second engaging caps removed to show further details of the other construction.

In a preferred configuration of the present invention the first slots 20 defined in the first mounting stud 16 that allow pivotal movement of the first convex mounting surface 17 inwardly to aid in the assembly and engagement of the first engaging cap 24 to the first mounting stud 16 will be significantly enhanced by forming these slots as four individual slots, preferably spaced equally ninety degrees from one another, around the first mounting stud as shown best in FIG. 2. Also, to facilitate engagement of the first locking rim 22 with respect to the first locking groove 32, a first outwardly extending lower shoulder 96 will preferably be positioned extending further outwardly from the first locking rim 22. This configuration is shown best in FIG. 5. This first outwardly extending lower shoulder 96 will facilitate engagement with respect to the first locking groove 32 while at the same time providing an angled surface against which the first engaging cap 24 will exert bias as it is pushed downwardly onto the first mounting stud 16 which facilitates inward flexing of the first convex surface 17 of the first mounting stud 16 to improve the speed and ease of assembly. The spring means of the present invention including both the first spring means 34 and the second spring means 55 will preferably be of a coil spring configuration as shown by coil springs 100. Also the first gripping surface 28 will preferably include first gripping teeth 102 defined therein to facilitate engagement with respect to footwear laces 12 placed thereadjacent.

The above description describes the operative connection between the first mounting stud 16 and the first engaging cap 24.

A cam cleat 10, as shown in the present invention, must include two engaging caps and for that reason the present invention further includes a second mounting stud 36 extending outwardly from the base member 14 at a position spaced from the first mounting stud member 16 such as to be adapted to receive a second engaging cap 46 thereupon. The construction which achieves engagement and movement between the second mounting stud 36 and the second engaging cap 46 is the mirror image of the construction of the combination of the first mounting stud 16 and the first engaging cap 24. The parts are identical, however the pivotal movement is biased toward the clockwise direction rather than the counterclockwise direction as described hereabove. As such, the second mounting stud 36 includes parts similar to the first mounting stud 16, namely, the second convex mounting surface 38 and the second bore means 40 and the second slot means 42 and the second locking rim 44. The second convex mounting surface 38 can include a similar two-part construction as described above which would include the second inner convex mounting surface 68 and the second outer convex mounting surface 70 as well as the second inner concave mounting surface 72 and the second outer concave mounting surface 74.

The second engaging cap 46 also includes parts directly equivalent to the parts of the first engaging cap means 24. In particular, second engaging cap means 46 includes a second mounting hole means 48 and a second gripping surface 50 along with a second concave mounting surface 52 and a second locking groove means 54. A second spring means 55 will also be included to bias the second engaging cap 46 in the clockwise direction relative to the second mounting stud 36.

A second spring containment annulus 58 will be similarly defined positioned between the second engaging cap 46 and the second mounting stud 36. Also a second central alignment pin 82 can be included which is adapted to extend into a second central hole 78 to maintain alignment between the second mounting stud 36 and the second engaging cap 46.

Furthermore a second enlarged chamber means 88 can be defined with a second tab means 90 extending thereinto to limit the magnitude of pivotal movement of the second engaging cap 46 relative to the second mounting stud 36. The second slot means 42 can be defined as four individual second slots 94 as shown best in FIG. 2.

The outer surface of the second engaging cap 46 can include second gripping teeth 104 as the second gripping surface 50 for enhanced engagement with respect to footwear laces 12 extending thereadjacent. Also the second locking rim 44 can include a second outwardly extending locking lower shoulder 98 to enhance locking engagement between the second locking rim 44 and the second locking groove 54 while also facilitating inward flexing of the second convex mounting surface 38 of the second mounting stud 36 as the second engagement cap 46 is pushed downwardly onto the second mounting stud 36 in order to mount it thereupon.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An improved cam cleat construction which is easy and quick to assemble and is particularly usable mounted on footwear for securement of footwear laces used therewith, said improved cam cleat construction comprising:

A. a base member being attachable with respect to footwear;
   B. a first mounting stud means extending away from said base member and being made of a flexibly resilient material, said first mounting stud means further including:
      (1) a first convex mounting surface extending therearound to facilitate pivotally movable mounting thereupon and being arcuate in shape;
      (2) a first bore means defined extending axially therewithin at least partially therethrough;
      (3) a plurality of first slot means defined extending longitudinally along said first convex mounting surface of said first mounting stud means, said first slot means extending inwardly from said first convex mounting surface into said first bore means to be in fluid flow communication with respect thereto, said first slot means being adapted to allow flexing of said first convex mounting surface inwardly toward said first bore means to facilitate pivotally movable mounting thereupon;
      (4) a first locking rim extending outwardly from said first convex mounting surface to facilitate locking engagement therewith;
   C. a first engaging cap means defining a first mounting hole means extending thereinto, said first mounting hole means adapted to receive said first convex mounting surface of said first mounting stud means extending thereinto to facilitate pivotally movably attachment therebetween, said first engaging cap means further including
      (1) a first gripping surface defined externally thereon which is adapted to engage footwear laces to facilitate securement thereof with respect to footwear;
      (2) a first concave mounting surface being arcuate and defined within said first mounting hole means, said first concave mounting surface being adapted to extend around said first convex mounting surface to facilitate movable engagement therewith to allow relative pivotal movement of said first engaging cap means with respect to said first mounting stud means to facilitate engagement of said first gripping surface with respect to footwear laces thereadjacent;
      (3) a first locking groove means defined within said first mounting hole means of said first engaging cap means along said first concave mounting surface thereof, said first locking groove means adapted to be receive and engage with said first locking rim extending thereinto to facilitate pivotally movable securement of said first engaging cap means with respect to said first mounting stud means;
   D. a first spring means attached with respect to said first mounting stud means and attached with respect to said first engaging cap means and biased to urge pivotal movement of said first engaging cap means with respect to said first mounting stud means to facilitate engagement of said first gripping surface with respect to footwear laces positioned thereadjacent;
   E. a second mounting stud means extending away from said base member and being made of a flexibly resilient material, said second mounting stud means being locate spatially disposed from said first mounting stud means on said base member, said second mounting stud means further including:

(1) a second convex mounting surface extending therearound to facilitate pivotal movable mounting thereupon and being arcuate in shape;
(2) a second bore means defined extending axially therewithin at least partially therethrough;
(3) a plurality of second slot means defined extending longitudinally along said second convex mounting surface of said second mounting stud means, said second slot means extending inwardly from said second convex mounting surface into said first bore means to be in fluid flow communication with respect thereto, said second slot means being adapted to allow flexing of said second convex mounting surface inwardly toward said second bore means to facilitate pivotally movable mounting thereupon;
(4) a second locking rim extending outwardly from said second convex mounting surface to facilitate locking engagement therewith;
F. a second engaging cap means defining a second mounting hole means extending thereinto, said second mounting hole means adapted to receive said second convex mounting surface of said second mounting stud means extending thereinto to facilitate pivotally movably attachment therebetween, said second engaging cap means further including
(1) a second gripping surface defined externally thereon which is adapted to engage footwear laces to facilitating securement thereof with respect to footwear, said second gripping surface being positioned adjacent said first gripping surface of said first engaging cap means to further facilitate selective engagement therebetween of the footwear laces;
(2) a second concave mounting surface defined within said second mounting hole means, said second concave mounting surface being adapted to extend around said second convex mounting surface to facilitate movable engagement therewith to allow relative pivotal movement of said second engaging cap means with respect to said second mounting stud means to facilitate engagement of said second gripping surface with respect to footwear laces threadjacent;
(3) a second locking groove means defined within said second mounting hole means of said second engaging cap means along said second concave mounting surface thereof, said second locking groove means adapted to be receive and engage with said second locking rim extending thereinto to facilitate pivotally movable securement of said second engaging cap means with respect to said second mounting stud means; and
G. a second spring means attached with respect to said second mounting stud means and attached with respect to said second engaging cap means and biased to urge pivotal movement of said second engaging cap means with respect to said second mounting stud means to facilitate engagement of said second gripping surface with respect to footwear laces positioned thereadjacent between said first gripping surface and said second gripping surface.

2. An improved cam cleat construction which is easy and quick to assemble and is particularly usable mounted on footwear for securement of footwear laces used therewith as defined in claim 1 wherein said first engaging cap means defines a first spring containment annulus defined within said first mounting hole means thereof for receiving said first spring means therewithin positioned between said first mounting stud means and said first engaging cap means and wherein said second engaging cap means defines a second spring containment annulus defined within said second mounting hole means thereof for receiving said second spring means therewithin positioned between said second mounting stud means and said second engaging cap means.

3. An improved cam cleat construction which is easy and quick to assemble and is particularly usable mounted on footwear for securement of footwear laces used therewith as defined in claim 1 wherein said first convex mounting surface includes a first inner convex mounting surface and a first outer convex mounting surface and wherein said first concave mounting surface includes a first inner concave mounting surface and a first outer concave mounting surface and wherein said second convex mounting surface includes a second inner convex mounting surface and a second outer convex mounting surface and wherein said second concave mounting surface includes a second inner concave mounting surface and a second outer concave mounting surface, said first inner convex mounting surface being in movable engagement with respect to said first inner concave mounting surface and said first outer convex mounting surface being in movable engagement with respect to said first outer concave mounting surface, said second inner convex mounting surface being in movable engagement with respect to said second inner concave mounting surface and said second outer convex mounting surface being in movable engagement with respect to said second outer concave mounting surface in order to further facilitate control of pivotal movement of said first engaging cap means with respect to said first mounting stud means and to further facilitate control of pivotal movement of said second engaging cap means with respect to said second mounting stud means.

4. An improved cam cleat construction which is easy and quick to assemble and is particularly usable mounted on footwear for securement of footwear laces used therewith as defined in claim 1 wherein said first mounting stud means defines a first central hole means in said first central bore means thereof which is coaxial with respect to said first central bore means and wherein said second mounting stud means defines a second central hole means in said second central bore means thereof which is coaxial with respect to said second central bore means.

5. An improved cam cleat construction which is easy and quick to assemble and is particularly usable mounted on footwear for securement of footwear laces used therewith as defined in claim 4 wherein said first engaging cap means includes a first central alignment pin oriented axially with respect to said first bore means thereof and being adapted to extend into said first central hole means of said first mounting stud means to facilitate alignment therewith during relative pivotal movement therebetween and wherein said second engaging cap means includes a second central alignment pin oriented axially with respect to said second bore means thereof and being adapted to extend into said second central hole means of said second mounting stud means to facilitate alignment therewith during relative pivotal movement therebetween.

6. An improved cam cleat construction which is easy and quick to assemble and is particularly usable mounted on footwear for securement of footwear laces used therewith as defined in claim 1 wherein said first convex mounting surface, said first concave mounting surface, said second convex mounting surface and said second concave mounting surface are arcuate.

7. An improved cam cleat construction which is easy and quick to assemble and is particularly usable mounted on footwear for securement of footwear laces used therewith as defined in claim 1 wherein said first engaging cap means defines a first enlarged chamber means immediately adjacent said first mounting hole means and wherein said first mounting stud means includes a first tab means extending outwardly therefrom into said first enlarged chamber means, said first tab means being adapted to limit the magnitude of pivotal movement of said first engaging cap means with respect to said first mounting stud means responsive to containment of said first tab means within said first enlarged chamber means, and wherein said second engaging cap means defines a second enlarged chamber means immediately adjacent said second mounting hole means and wherein said second mounting stud means includes a second tab means extending outwardly therefrom into said second enlarged chamber means, said second tab means being adapted to limit the magnitude of pivotal movement of said second engaging cap means with respect to said second mounting stud means responsive to containment of said second tab means within said second enlarged chamber means.

8. An improved cam cleat construction which is easy and quick to assemble and is particularly usable mounted on footwear for securement of footwear laces used therewith as defined in claim 1 wherein said first slot means includes four individual first slots defined at equally spaced positions around said first mounting stud means and wherein said second slot means includes four individual second slots defined at equally spaced positions around said second mounting stud means to facilitate inwardly flexing of said first mounting stud means and said second mounting stud means to facilitate securement thereto of said first engaging cap means and said second engaging cap means, respectively.

9. An improved cam cleat construction which is easy and quick to assemble and is particularly usable mounted on footwear for securement of footwear laces used therewith as defined in claim 1 wherein said first locking rim and said second locking rim are both annularly shaped.

10. An improved cam cleat construction which is easy and quick to assemble and is particularly usable mounted on footwear for securement of footwear laces used therewith as defined in claim 1 wherein said first locking rim includes an first outwardly extending lower shoulder to facilitate engagement with respect to said first locking groove means and wherein said second locking rim includes an second outwardly extending lower shoulder to facilitate engagement with respect to said second locking groove means.

11. An improved cam cleat construction which is easy and quick to assemble and is particularly usable mounted on footwear for securement of footwear laces used therewith as defined in claim 1 wherein said first locking groove means and said second locking groove means are both annularly shape.

12. An improved cam cleat construction which is easy and quick to assemble and is particularly usable mounted on footwear for securement of footwear laces used therewith as defined in claim 1 wherein said first engaging cap means and said second engaging cap means are asymmetrically round in shape.

13. An improved cam cleat construction which is easy and quick to assemble and is particularly usable mounted on footwear for securement of footwear laces used therewith as defined in claim 1 wherein said first spring means and said second spring means are both coil springs extending around said first mounting stud means and said second mounting stud means, respectively.

14. An improved cam cleat construction which is easy and quick to assemble and is particularly usable mounted on footwear for securement of footwear laces used therewith as defined in claim 1 wherein said first gripping surface of said first engaging cap means and said second gripping surface of said second engaging cap means can be spaced apart by a distance less than the size of the footwear laces responsive to pivotal movement of said first engaging cap means and said second engaging cap means.

15. An improved cam cleat construction which is easy and quick to assemble and is particularly usable mounted on footwear for securement of footwear laces used therewith as defined in claim 1 wherein said first mounting stud means and said second mounting stud means extend perpendicularly upwardly from said base member.

16. An improved cam cleat construction which is easy and quick to assemble and is particularly usable mounted on footwear for securement of footwear laces used therewith as defined in claim 1 wherein said first gripping surface includes first gripping teeth means thereon and wherein said second gripping surface includes second gripping teeth means thereon to facilitate engagement with footwear laces positioned thereadjacent and therebetween.

17. An improved cam cleat construction which is easy and quick to assemble and is particularly usable mounted on footwear for securement of footwear laces used therewith as defined in claim 3 wherein said first outer convex mounting surface and said first outer concave mounting surface are positioned closer to said base member than said first inner convex mounting surface and said first inner concave mounting surface.

18. An improved cam cleat construction which is easy and quick to assemble and is particularly usable mounted on footwear for securement of footwear laces used therewith as defined in claim 17 wherein said first engaging cap means defines a first spring containment annulus within said first mounting hole means at a position between said first outer convex mounting surface and said first inner convex mounting surface for receiving said first spring means therewithin positioned between said first mounting stud means and said first engaging cap means and wherein said second engaging cap means defines a second spring containment annulus within said second mounting hole means at a position between said second outer convex mounting surface and said second inner convex mounting surface for receiving said second spring means therewithin positioned between said second mounting stud means and said second engaging cap means.

19. An improved cam cleat construction which is easy and quick to assemble and is particularly usable mounted on footwear for securement of footwear laces used therewith, said improved cam cleat construction comprising:

A. a base member being attachable with respect to footwear;

B. a first mounting stud means extending away from said base member and being made of a flexibly resilient material, said first mounting stud means further including:

(1) a first convex mounting surface extending therearound to facilitate pivotally movable mounting thereupon;

(2) a first bore means defined extending axially therewithin at least partially therethrough;

(3) a plurality of first slot means defined extending longitudinally along said first convex mounting surface of said first mounting stud means, said first slot means extending inwardly from said first convex mounting surface into said first bore means to be in fluid flow communication with respect thereto, said first slot means being adapted to allow flexing of said first convex mounting surface inwardly toward said first bore means to facilitate pivotally movable mounting thereupon;
  (4) a first locking rim being arcuate and extending outwardly from said first convex mounting surface to facilitate locking engagement therewith;
  (5) a first tab means extending outwardly from said first convex mounting surface;
C. a first engaging cap means defining a first mounting hole means extending thereinto, said first mounting hole means adapted to receive said first convex mounting surface of said first mounting stud means extending thereinto to facilitate pivotally movably attachment therebetween, said first engaging cap means further including
  (1) a first gripping surface defined externally thereon which is adapted to engage footwear laces to facilitate securement thereof with respect to footwear;
  (2) a first concave mounting surface defined within said first mounting hole means, said first concave mounting surface being adapted to extend around said first convex mounting surface to facilitate movable engagement therewith to allow relative pivotal movement of said first engaging cap means with respect to said first mounting stud means to facilitate engagement of said first gripping surface with respect to footwear laces thereadjacent;
  (3) a first locking groove means defined within said first mounting hole means of said first engaging cap means along said first concave mounting surface thereof and being annular in shape, said first locking groove means adapted to be receive and engage with said first locking rim extending thereinto to facilitate pivotally movable securement of said first engaging cap means with respect to said first mounting stud means;
  (4) a first spring containment annulus defined within said first mounting hole means thereof;
  (5) a first enlarged chamber means immediately adjacent said first mounting hole means and being adapted to receive said first tab means extending thereinto, said first tab means being adapted to limit the magnitude of pivotal movement of said first engaging cap means with respect to said first mounting stud means responsive to containment of said first tab means within said first enlarged chamber means;
D. a first spring means attached with respect to said first mounting stud means and attached with respect to said first engaging cap means and biased to urge pivotal movement of said first engaging cap means with respect to said first mounting stud means to facilitate engagement of said first gripping surface with respect to footwear laces positioned thereadjacent, said first spring means being positioned extending from said first mounting stud means to said first engaging cap means through said first spring containment annulus;
E. a second mounting stud means extending away from said base member and being made of a flexibly resilient material, said second mounting stud means being locate spatially disposed from said first mounting stud means on said base member, said second mounting stud means further including:
  (1) a second convex mounting surface extending therearound to facilitate pivotal movable mounting thereupon;
  (2) a second bore means defined extending axially therewithin at least partially therethrough;
  (3) a plurality of second slot means defined extending longitudinally along said second convex mounting surface of said second mounting stud means, said second slot means extending inwardly from said second convex mounting surface into said first bore means to be in fluid flow communication with respect thereto, said second slot means being adapted to allow flexing of said second convex mounting surface inwardly toward said second bore means to facilitate pivotally movable mounting thereupon;
  (4) a second locking rim being arcuate and extending outwardly from said second convex mounting surface to facilitate locking engagement therewith;
  (5) a second tab means extending outwardly from said second convex mounting surface;
F. a second engaging cap means defining a second mounting hole means extending thereinto, said second mounting hole means adapted to receive said second convex mounting surface of said second mounting stud means extending thereinto to facilitate pivotally movably attachment therebetween, said second engaging cap means further including
  (1) a second gripping surface defined externally thereon which is adapted to engage footwear laces to facilitating securement thereof with respect to footwear, said second gripping surface being positioned adjacent said first gripping surface of said first engaging cap means to further facilitate selective engagement therebetween of the footwear laces;
  (2) a second concave mounting surface defined within said second mounting hole means, said second concave mounting surface being adapted to extend around said second convex mounting surface to facilitate movable engagement therewith to allow relative pivotal movement of said second engaging cap means with respect to said second mounting stud means to facilitate engagement of said second gripping surface with respect to footwear laces thereadjacent;
  (3) a second locking groove means defined within said second mounting hole means of said second engaging cap means along said second concave mounting surface thereof, said second locking groove means adapted to be receive and engage with said second locking rim extending thereinto to facilitate pivotally movable securement of said second engaging cap means with respect to said second mounting stud means and being annular in shape;
  (4) a second spring containment annulus defined within said second mounting hole means thereof;
  (5) a second enlarged chamber means immediately adjacent said second mounting hole means and being adapted to receive said second tab means extending thereinto, said second tab means being adapted to limit the magnitude of pivotal movement of said second engaging cap means with respect to said second mounting stud means responsive to containment of said second tab means within said second enlarged chamber means; and
G. a second spring means attached with respect to said second mounting stud means and attached with respect to said second engaging cap means and biased to urge pivotal movement of said second engaging cap means with respect to said second mounting stud means to facilitate engagement of said second gripping surface with respect to footwear laces positioned thereadjacent between said first gripping surface and said second gripping surface, said second spring means being positioned extending from said second mounting stud means to said second engaging cap means through said second spring containment annulus.

20. An improved cam cleat construction which is easy and quick to assemble and is particularly usable mounted on footwear for securement of footwear laces used therewith, said improved cam cleat construction comprising:

A. a base member being attachable with respect to footwear;

B. a first mounting stud means extending perpendicularly away from said base member and being made of a flexibly resilient material, said first mounting stud means further including:
  (1) a first convex mounting surface extending therearound to facilitate pivotally movable mounting thereupon;
  (2) a first bore means defined extending axially therewithin at least partially therethrough;
  (3) a plurality of first slot means defined extending longitudinally along said first convex mounting surface of said first mounting stud means, said first slot means extending inwardly from said first convex mounting surface into said first bore means to be in fluid flow communication with respect thereto, said first slot means being adapted to allow flexing of said first convex mounting surface inwardly toward said first bore means to facilitate pivotally movable mounting thereupon, said first slot means including four individual first slots defined at equally spaced positions around said first mounting stud means;
  (4) a first locking rim being arcuate and extending outwardly from said first convex mounting surface to facilitate locking engagement therewith, said first locking rim including an first outwardly extending lower shoulder to facilitate engagement therewith;
  (5) a first tab means extending outwardly from said first convex mounting surface;
  (6) a first central hole means in said first central bore means thereof which is coaxial with respect to said first central bore means;

C. a first engaging cap means defining a first mounting hole means extending thereinto, said first mounting hole means adapted to receive said first convex mounting surface of said first mounting stud means extending thereinto to facilitate pivotally movably attachment therebetween, said first engaging cap means further including
  (1) a first gripping surface defined externally thereon which is adapted to engage footwear laces to facilitate securement thereof with respect to footwear;
  (2) a first concave mounting surface defined within said first mounting hole means, said first concave mounting surface being adapted to extend around said first convex mounting surface to facilitate movable engagement therewith to allow relative pivotal movement of said first engaging cap means with respect to said first mounting stud means to facilitate engagement of said first gripping surface with respect to footwear laces thereadjacent;
  (3) a first locking groove means defined within said first mounting hole means of said first engaging cap means along said first concave mounting surface thereof and being annular in shape, said first locking groove means adapted to be receive and engage with said first locking rim extending thereinto to facilitate pivotally movable securement of said first engaging cap means with respect to said first mounting stud means;
  (4) a first spring containment annulus defined within said first mounting hole means thereof;
  (5) a first enlarged chamber means immediately adjacent said first mounting hole means and being adapted to receive said first tab means extending thereinto, said first tab means being adapted to limit the magnitude of pivotal movement of said first engaging cap means with respect to said first mounting stud means responsive to containment of said first tab means within said first enlarged chamber means;
  (6) a first central alignment pin oriented axially with respect to said first bore means and being adapted to extend into said first central hole means of said first mounting stud means to facilitate alignment therewith during relative pivotal movement therebetween;

D. a first spring means attached with respect to said first mounting stud means and attached with respect to said first engaging cap means and biased to urge pivotal movement of said first engaging cap means with respect to said first mounting stud means to facilitate engagement of said first gripping surface with respect to footwear laces positioned thereadjacent, said first spring means being positioned extending from said first mounting stud means to said first engaging cap means through said first spring containment annulus;

E. a second mounting stud means extending perpendicularly away from said base member and being made of a flexibly resilient material, said second mounting stud means being locate spatially disposed from said first mounting stud means on said base member, said second mounting stud means further including:
  (1) a second convex mounting surface extending therearound to facilitate pivotal movable mounting thereupon;
  (2) a second bore means defined extending axially therewithin at least partially therethrough;
  (3) a plurality of second slot means defined extending longitudinally along said second convex mounting surface of said second mounting stud means, said second slot means extending inwardly from said second convex mounting surface into said first bore means to be in fluid flow communication with respect thereto, said second slot means being adapted to allow flexing of said second convex mounting surface inwardly toward said second bore means to facilitate pivotally movable mounting thereupon, said second slot means including four individual second slots defined at equally spaced positions around said second mounting stud means;
  (4) a second locking rim being arcuate and extending outwardly from said second convex mounting surface to facilitate locking engagement therewith, said second locking rim further including an second outwardly extending lower shoulder to facilitate engagement therewith;
  (5) a second tab means extending outwardly from said second convex mounting surface;

(6) a second central hole means in said second central bore means thereof which is coaxial with respect to said first central bore means;

F. a second engaging cap means defining a second mounting hole means extending thereinto, said second mounting hole means adapted to receive said second convex mounting surface of said second mounting stud means extending thereinto to facilitate pivotally movably attachment therebetween, said second engaging cap means further including (1) a second gripping surface defined externally thereon which is adapted to engage footwear laces to facilitate securement thereof with respect to footwear, said second gripping surface being positioned adjacent said first gripping surface of said first engaging cap means to further facilitate selective engagement therebetween of the footwear laces;

(2) a second concave mounting surface defined within said second mounting hole means, said second concave mounting surface being adapted to extend around said second convex mounting surface to facilitate movable engagement therewith to allow relative pivotal movement of said second engaging cap means with respect to said second mounting stud means to facilitate engagement of said second gripping surface with respect to footwear laces thereadjacent;

(3) a second locking groove means defined within said second mounting hole means of said second engaging cap means along said second concave mounting surface thereof, said second locking groove means adapted to be receive and engage with said second locking rim extending thereinto to facilitate pivotally movable securement of said second engaging cap means with respect to said second mounting stud means and being annular in shape;

(4) a second spring containment annulus defined within said second mounting hole means thereof;

(5) a second enlarged chamber means immediately adjacent said second mounting hole means and being adapted to receive said second tab means extending thereinto, said second tab means being adapted to limit the magnitude of pivotal movement of said second engaging cap means with respect to said second mounting stud means responsive to containment of said second tab means within said second enlarged chamber means;

(6) a second central alignment pin oriented axially with respect to said second bore means and being adapted to extend into said second central hole means of said second mounting stud means to facilitate alignment therewith during relative pivotal movement therebetween; and G. a second spring means attached with respect to said second mounting stud means and attached with respect to said second engaging cap means and biased to urge pivotal movement of said second engaging cap means with respect to said second mounting stud means to facilitate engagement of said second gripping surface with respect to footwear laces positioned thereadjacent between said first gripping surface and said second gripping surface, said second spring means being positioned extending from said second mounting stud means to said second engaging cap means through said second spring containment annulus.

\* \* \* \* \*